United States Patent [19]

Ouwerkerk

[11] Patent Number: 4,527,409
[45] Date of Patent: Jul. 9, 1985

[54] PROCESS OF HOT-ROLLING STEEL USING A HEAT-REFLECTING SCREEN

[75] Inventor: Johannes H. W. Ouwerkerk, Driehuis, Netherlands

[73] Assignee: Hoogovens Groep B.V., Ijmuiden, Netherlands

[21] Appl. No.: 459,679

[22] Filed: Jan. 20, 1983

[30] Foreign Application Priority Data

Jan. 26, 1982 [NL] Netherlands ............. 8200265

[51] Int. Cl.³ .................. B21B 43/00; B21B 45/02
[52] U.S. Cl. ........................................ 72/202
[58] Field of Search ............ 72/200, 202, 342, 364; 266/259; 432/10, 65, 194, 233, 238, 248, 249

[56] References Cited

U.S. PATENT DOCUMENTS

| 2,529,689 | 11/1950 | Hess | 72/202 X |
| 2,529,690 | 11/1950 | Hess | 432/194 X |
| 3,264,856 | 8/1966 | Layard | 72/202 |
| 3,344,648 | 10/1967 | Gray | 72/202 X |
| 4,343,168 | 8/1982 | Laws et al. | 72/202 X |
| 4,382,374 | 5/1983 | Kopineck et al. | 72/202 |
| 4,382,586 | 5/1983 | Reese | 266/259 |

Primary Examiner—E. Michael Combs
Attorney, Agent, or Firm—Stevens, Davis, Miller & Mosher

[57] ABSTRACT

In a process of hot-rolling steel wherein use is made of a heat-reflecting screen (13) by which heat radiating from the work (1) is reflected back to the work, the invention comprises the step of cooling the heat-reflecting-surface (10) of the screen during use, e.g. by flowing fluid coolant along the paths (18) in heat-conducting relationship to such heat-reflecting surface.

5 Claims, 3 Drawing Figures

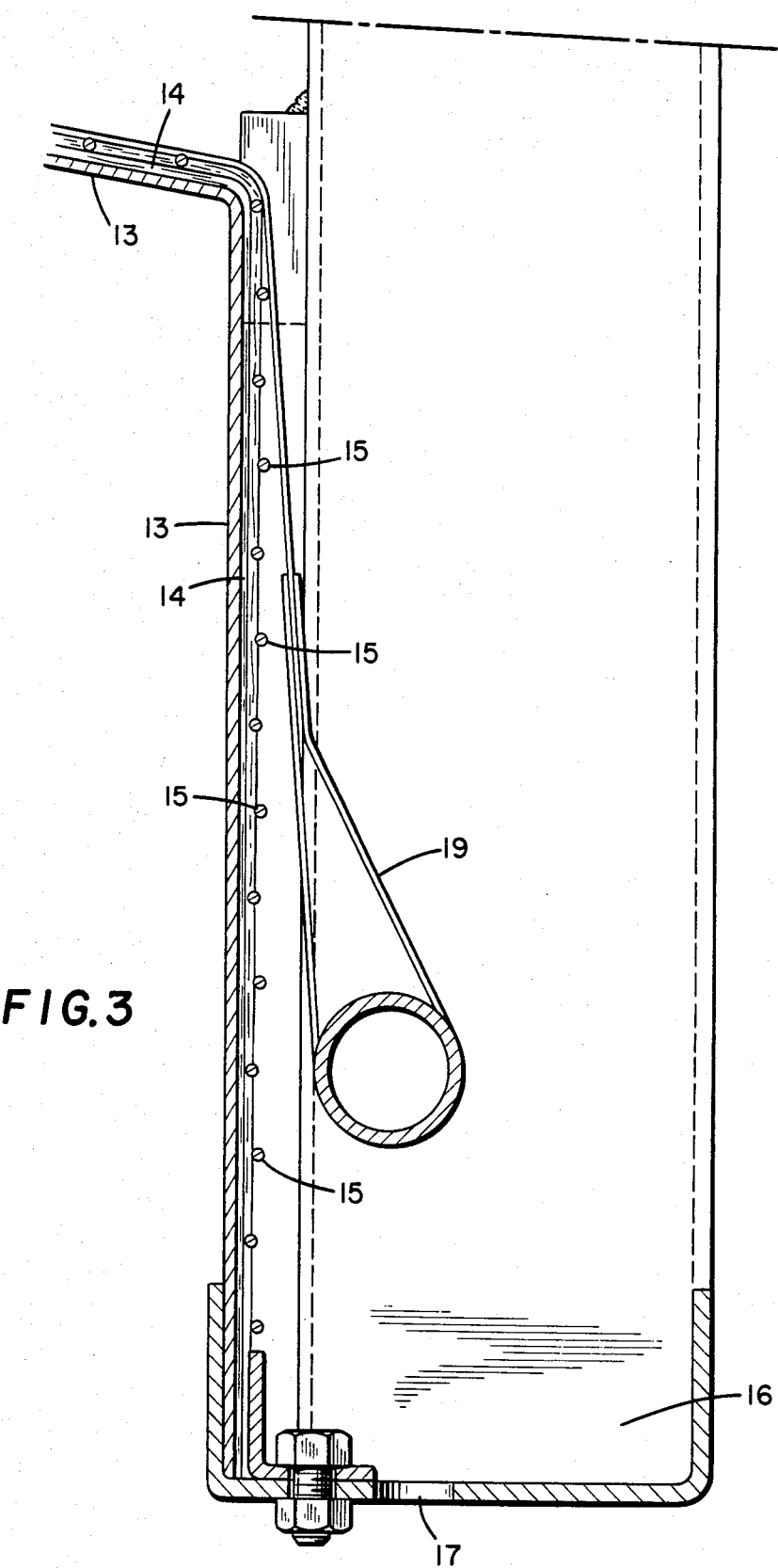

PROCESS OF HOT-ROLLING STEEL USING A HEAT-REFLECTING SCREEN

This invention relates to a process of hot-rolling steel wherein heat loss from the steel is reduced by means of one or more heat-reflecting screens having a radiant heat-reflecting surface facing the work. The invention also relates to apparatus comprising a heat-reflecting screen suitable for use in such a process.

In the hot processing of metals, it is known to use heat shields for reducing heat losses from the workpieces and thereby reducing the overall energy consumption of the process. The known heat shields include heat-absorbing screens and heat-reflecting screens. Absorbing screens function by absorbing a large part of the incident heat radiation and consequently becoming heated to a high temperature so that heat is radiated from the screen back to the work. Reflecting screens have surfaces with a high reflection coefficient so that a large part of the incident heat radiation is reflected back to the work. Some part of the incident radiant heat energy is of course inevitably absorbed by such reflecting screens.

In some hot-rolling processes, heat-absorbing screens are not suitable because of their thermal inertia. For example in a hot strip rolling mill with accelerated finishing roll train, wherein it is necessary to prevent the temperature of the head of the billet from falling below a certain critical temperature, an absorption screen is not suitable for this purpose because there is insufficient time for the screen to be heated by the billet head.

Heat-absorbing and heat-reflecting screens are referred to in the European patent application bearing the publication No. 0 005 340. The screens therein described comprise a heat-absorbing or heat-reflecting plate on their front side, i.e. the side facing the work, and behind the plate there is a heat-insulating core or backing for reducing heat loss by radiation from the rear side of the plate. The plate is therefore maintained at a high temperature during use. The said European patent application specifies stainless steel, which can be made either heat-reflecting or heat-absorbing, as a suitable material for the front plate of the screens.

Experience has shown that when heat-reflecting screens are used as previously proposed, for reducing heat loss from steel work-pieces in course of hot-rolling, the reflectivity of the screens becomes significantly reduced in course of time, even if they are kept clean. This is a problem which the said European patent application acknowledges has occurred when using aluminium heat-reflecting screens for reducing heat loss from the top surface of hot steel strip during transport from roughing to finishing mill stands. However, the problem of decreasing reflectivity has also been found to occur when using other heat-reflecting materials, including stainless steel.

It is an object of the present invention to enable heat-reflecting screens to be used without loss or with smaller loss of their efficiency in course of time.

According to the present invention, there is provided a process of hot-rolling steel wherein heat loss from the work is reduced by means of a heat-reflecting screen having a radiant heat-reflecting surface facing the work, characterised in that decrease in the reflectivity of the screen in course of time is reduced by cooling the screen during use.

By the step of cooling a heat-reflecting screen, quite remarkable improvements in the efficiency retention of the screen can be realised. In consequence, by using the invention, heat energy consumption over a given operating period can be reduced or a given screen can be kept in use for a longer period of time without increasing the heat energy consumption.

A cooled screen can be used in accordance with the present invention for reducing heat loss from the work during rolling, or during transition from one rolling stage to another. The invention is applicable for example in a hot strip rolling mill, a blooming mill, a plate rolling mill or a mill for rolling non-flat (profiled) sections. Such a reduction of heat loss can have the consequence that the work can leave the furnace at a lower temperature. In a mill with accelerated finishing roll stand the invention can for example be applied for reducing heat loss from the billet heads.

A cooled screen can also be used in accordance with the present invention for reducing heat loss from work pieces while they are stored, e.g. on a delay table, following their removal from a continuous casting or some other heating furnace. For the purpose of the present specification such conservation of the heat of the work preparatory to rolling is considered to be part of the rolling process.

It will be understood that two or more heat-reflecting screens, cooled in accordance with the invention, can be used at any given location or at different locations along the path of the work. References herein to "the screen" as if only a single screen is used, is merely for convenience.

The heat-reflecting screen is preferably of panel or plate form, but other forms can be used.

The rate at which cold must be supplied to the screen in order to reduce reflectivity deterioration during its use depends on the material of the screen. For a given screen material, an appropriate cooling rate can be determined by tests. Indications of recommended operating temperature of particular cooled screens are given hereinafter.

For obtaining the best results it is of course necessary to avoid any significant condensation of water on the reflecting surface of the screen. If the screen is in a humid environment, the temperature of the screen is therefore preferably kept above the dew point. The air humidity may for example be locally very high, partly as a result of the use of high pressure sprays or jets for removing the oxide layer from the metal to be rolled and partly because of water vapour rising from the oxide drain beneath the table.

Various metals can be used for providing the heat-reflecting surface. Attractive materials from the economic point of view include stainless steel and anodised aluminium. When using such materials it is advisable for the cooling to be sufficient at least to keep the temperature of the heat-reflecting surface below 300° C. and below 600° C. respectively.

Preferably the material forming the heat-reflecting surface is stainless steel. This material is preferred because it provides a useful combination of properties. In particular, the material can provide a surface which has a very satisfactory heat-reflectivity and which has a good resistance to chemical change.

In certain advantageous processes according to the invention use is made of a heat-reflecting screen whose reflecting surface is formed by stainless steel and is cooled to a temperature below 300° C. Tests have shown that when a stainless steel heat-reflecting screen is cooled to that extent the efficiency retention is much better than when using the screen without cooling it. An uncooled stainless steel screen suffers a marked decrease in reflectivity during only a very short period of use, (e.g. one day). It has been found that if an identical screen is kept cooled during use to maintain its reflective surface below 300° C. there is no perceptible reduction in the heat reflection coefficient during many weeks of continuous use and it is likely that the screen will remain effective even over a period of some years.

The cooling is preferably achieved by continuously flowing a gaseous or liquid coolant in heat-conducting relationship to the screen. The screen may for example be formed by a plate or other body forming a wall of a hollow structure through which the coolant is passed.

In some embodiments of the invention, air is used as the coolant. This coolant is very convenient to use. The air supplied to the screen can be derived from the atmosphere at ordinary temperature and the used air leaving the screen can by simply exhausted to atmosphere. The required air flow can be generated by means of a fan. Cooling fins may be associated with the screen to afford an extended heat-exchange surface.

In other processes according to the invention a liquid coolant is used, preferably water. The liquid coolant can be conducted along a duct or ducts which is or are in heat-conducting relationship with the rear of the plate or other body having the heat-reflecting surface, or which is or are formed within that body. In another embodiment which has given very satisfactory results, cooling water is discharged e.g. sprayed, so as to flow over the rear of said body. The liquid can be conducted to a position behind the said body by at least one cooling water supply pipe having discharge orifices from which the coolant discharge in the form of sprays against the rear of the body. An open or closed water cooling system can by used.

The temperature of the heat reflecting surface is preferably kept at least several degrees, e.g. 10° C. above the dew point to prevent condensation. This can be obtained by using coolant which has been heated to a temperature above the dew point.

In using coolant, which has been derived from a source at ordinary temperature however, the screen can, have a rear lining or backing which has some heat-insulating effect such that the reflecting surface of the screen is kept sufficiently above the temperature of the coolant to avoid condensation of water on such surface. It is very suitable to provide a said lining or backing which is porous.

It has been found very beneficial to maintain the heat-reflecting surface of the screen at a temperature which is above the dew point of the gaseous environment and which is in the range 70° an 80° C. That range is suitablefor example if the dew point is about 55° C., which is quite typical for a steel rolling mill.

As hereinbefore stated the invention also relates to apparatus comprising a heat-reflecting screen suitable for use in a process according to the invention as hereinbefore defined.

Apparatus according to the present invention, which comprises a heat-reflecting screen suitable for use in a steel rolling mill of reducing heat loss from the work, is characterised in that in or in heat-conducting relationship to the body of material providing the heat-reflecting surface of the screen, there is at least one pathway along which coolant can be passed for cooling said heat-reflecting surface.

Preferably the body of material providing said heat-reflecting surface is in the form of a plate or panel.

Preferred apparatus according to the invention includes means for discharging liquid coolant against the rear side of the body providing the heat-reflecting surface.

In particularly advantageous apparatus according to the invention, the body providing said heat-reflecting surface has a lining or backing having a thermally insulating property for creating a temperature gradient between the coolant and said heat-reflecting surface. Preferably said lining is porous.

In some apparatus according to the invention the said coolant pathway(s) form(s) part of an open water-cooling system.

Certain embodiments of the process and apparatus according to the invention, selected by way of example, will now be described with reference to the accompanying diagrammatic drawings, in which:

FIG. 3 shows the detail marked III in FIG. 1 on a largerscale.

Figure 1:
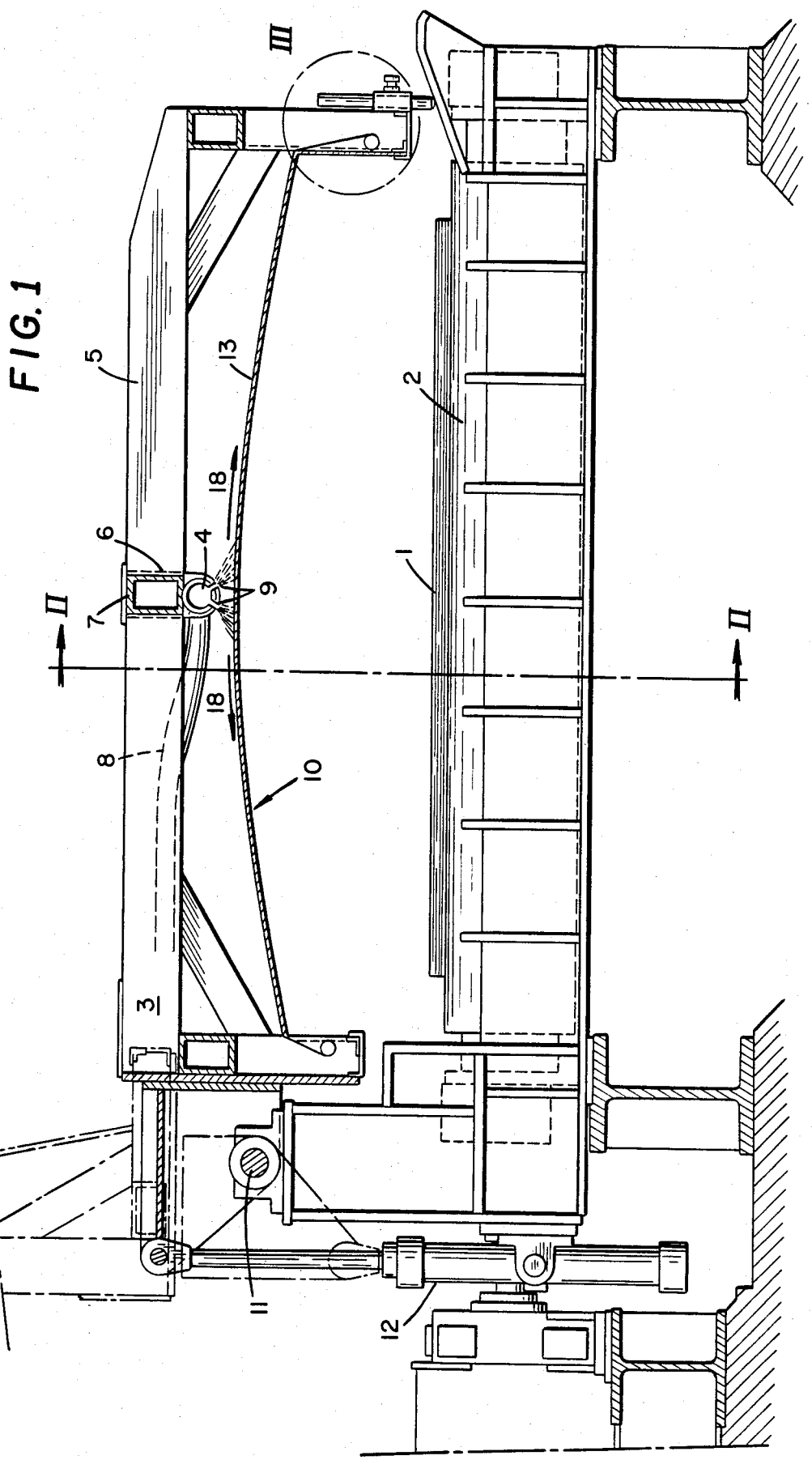
FIG. 1 is transverse cross-section of part of a hot strip rolling mill, the section being on line I-I in FIG. 2.
Figure 2:
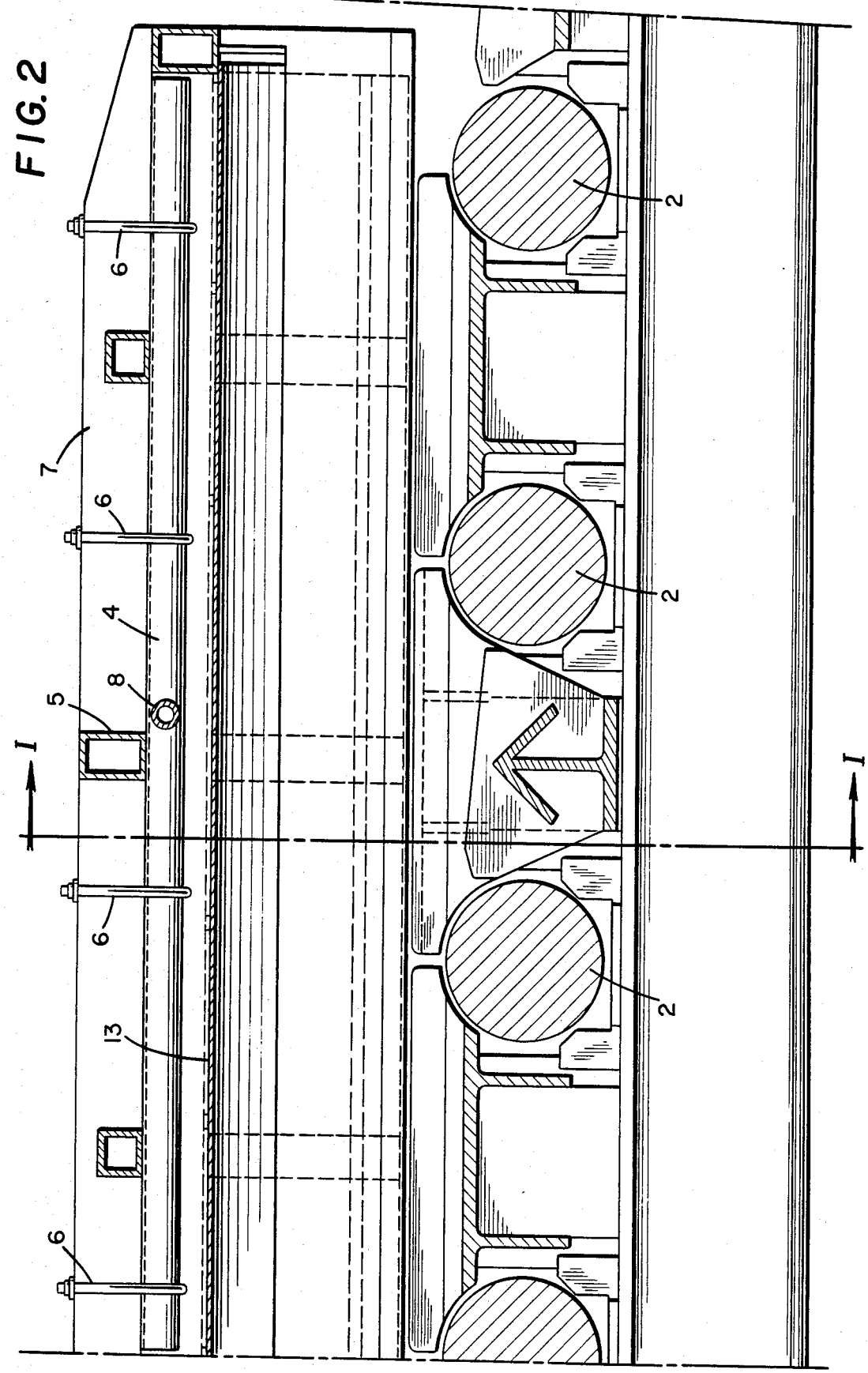
FIG. 2 is longitudinal section on line II—II in FIG. 1.

FIGS. 1 and 2 show a work piece 1 supported by conveying rolls 2 of a track along which the workpiece is transported from a roughing train towards the finishing mill. Over the path of the work there is a hood structure 3 including a heat-reflecting screen 13 which is continuously cooled. The cooled screen serves to reduce heat loss from the work during the delay time between roughing and finishing.

Before describing the screen structure, the following indication is given of possible operating conditions which may be encountered. The particulars cited are merely by way of example. The workpiece, which may after roughing have for example a thickness of 40 mm, a width of 2000 mm and a length of 60 m, may leave the slab furnace at approximately 1200° C. and have, after leaving the roughing train, a surface temperature of approximately 1100° C. The delay time preparatory to the final rolling may average about 60 seconds for the head of the workpiece and about 80–120 seconds for the tail and during this delay the workpiece may cool at a rate of about 2° C./sec. It is necessary that the temperature of all parts of the workpiece shall be above the critical recrystallisation temperature during the final rolling. This critical temperature is approximately 850° C., depending on the type of the steel. During normal, i.e. non-accelerated, final rolling the tail of the workpiece will be at a lower temperature than the head because of the longer delay time for the tail, whereas when the finishing mill stands are accelerated heat loss from the tail is less than from the head, due to the acceleration, and thus the head is critical. The cooled heat-reflecting screen reduces heat loss from the work and in consequence the temperature at which the work leaves the furnace can be lower.

A process in which a cooled screen is arranged above the work has been selected for illustration merely by way of example. The invention includes processes in which use is made of one or more cooled screens located at some other position or positions, e.g. on opposite sides of the path of the work and/or underneath that path, between the rollers of the roller track. Of course a screen or screens located at the sides and/or beneath the work path may be used in addition to a screen or screens above that path. As further examples a cooled screen may be used before a roughing train. In a plant which comprises a plurality of roughing roll stands, a cooled screen may be located between successive stands.

Referring now to the example illustrated: the heat-reflecting screen 13 forming part of the hood structure 3 comprises a lower, heat-reflecting surface 10 with a high radiant heat reflecting coefficient. The screen is bent to provide a roof portion extending over the full width of the work path, and vertical side margins.

The heat-reflecting screen 13 is secured to a lightweight frame 5 of sufficient dimensional stability comprising longitudinal tubular beams and interconnecting transverse tubular beams. Cooling water is continuously supplied to a water discharge pipe 4 extending along the longitudinal central region of the hood structure, above the heat-reflecting screen 13 This pipe is connected to the central longitudinal beam 7 of the hood frame by straps 6. Water is fed into the water discharge pipe 4 by a supply duct 8. The discharge pipe 4 has discharge ports such as 9 distributed along its length, through which water is continuously sprayed onto the rear, i.e. the top side, of the screen 13. The cooling water flows over the rear of the screen and into the side compartments 16 of the hood, from which the water discharges via drain ports 17. Arrows 18 represent typical water flow paths.

In the illustrated embodiment, the metal sheets forming the screen 13 are thin. They are sheets of stainless steel 2 mm thick. Therefore only a small temperature drop occurs over the thickness of the screen. The air in the vicinity of the screen is very humid, because high pressure jets of water are used for removing the oxide which forms on the work and water vapour rises from the oxide drain under the work conveying track. Water vapour will therefore condense on the reflecting surface 10 of the screen if its temperature is lower than the dew point, thereby reducing the reflectivity of the screen. The temperature of the heat reflecting surface 10 is preferably kept at least several degrees, e.g. at least 10° C., above the dew point. Such condensation can be prevented by using cooling water which has been heated to a temperature above the dew point, before discharge from the pipe 4. In a preferred method way of carrying out the invention a heat-insulating lining 14 is provided at the rear side of the metal screen 13, so that there is a significant temperature gradient between the exposed side of the lining layer and the reflecting surface 10 of the heat-reflecting screen. By this means it is possible for example to maintain the heat-reflecting surface of the cooled screen at a temperature above the dew point, e.g. at a temperature of 70° to 80° C., even when supplying the water-discharge pipe 4 with water at ordinary temperature e.g. at 20° C. In the illustrated apparatus the lining 14 is held against the screen 13 by galvanised wire netting 15 retained in position by retaining means 19.

For forming a said insulating lining, it is preferred to use a porous material. In the event that the cooling water supply fails, cooling of the screen can continue for sometime in consequence of evaporation of absorbed water from the porous layer. It is suitable to use a fibrous material e.g. a mineral or glass wool, for the insulating layer. A particular material which has been found very suitable for forming an insulating lining on the rear side of the screen 13 is the ceramic fibre paper composed of alumina-silica fibres marketed under the Trade Mark "Fiberfrax" by The Carborundum Company Limited.

The hood structure 3, comprising the heat-reflecting screen 13, its mounting frame and the water discharge pipe 4, is mounted for rotation about a shaft 11 by means of a lifting jack 12. The hood can be swung upwardly from its illustrated operative position into a vertical position indicated in broken line in FIG. 1. In this vertical position the heat-reflecting screen and the roll track are easily accessible.

I claim:

1. A process for hot-rolling steel utilizing a heat-reflecting screen having a radiant heat-reflecting surface facing the work comprising passing the work beneath the screen, flowing fluid coolant in heat-exchange relationship with said surface and maintaining the temperature of said heat-reflecting surface above the dew point of the atmosphere in contact with it.

2. The process according to claim 1 wherein said heat reflecting surface is made of stainless steel and the temperature of the heat-reflecting surface is maintained below 300 C.

3. The process according to claim 1, wherein the material forming the heat-reflecting surface of the screen is stainless steel.

4. The process according to claim 1, wherein the material forming the heat-reflecting surface of the screen is anodised aluminum.

5. The process according to claim 1, wherein the coolant is water which is caused to flow over the rear side of said screen.

* * * * *